US012162102B2

(12) United States Patent
Kadlec et al.

(10) Patent No.: US 12,162,102 B2
(45) Date of Patent: Dec. 10, 2024

(54) WELDING POWER SUPPLIES AND USER INTERFACES TO CONTROL OUTPUT POLARITY FOR WELDING POWER SUPPLIES

(71) Applicant: Illinois Tool Works Inc., Glenview, IL (US)

(72) Inventors: Mark S. Kadlec, Shiocton, WI (US); Al J. DeCoster, Kaukauna, WI (US); Andrew J. Pfaller, Hilbert, WI (US)

(73) Assignee: Illinois Tool Works Inc., Glenview, IL (US)

( * ) Notice: Subject to any disclaimer, the term of this patent is extended or adjusted under 35 U.S.C. 154(b) by 289 days.

(21) Appl. No.: 16/427,876

(22) Filed: May 31, 2019

(65) Prior Publication Data

US 2019/0366469 A1 Dec. 5, 2019

Related U.S. Application Data

(60) Provisional application No. 62/678,489, filed on May 31, 2018.

(51) Int. Cl.
*B23K 9/10* (2006.01)

(52) U.S. Cl.
CPC .......... *B23K 9/1087* (2013.01); *B23K 9/1062* (2013.01)

(58) Field of Classification Search
CPC ...... B23K 9/10; B23K 9/1006; B23K 9/1056; B23K 9/0956; B23K 9/1087; B23K 9/0953; B23K 9/1062
See application file for complete search history.

(56) References Cited

U.S. PATENT DOCUMENTS 7,952,051 B2   5/2011   Veik
8,288,686 B2 * 10/2012  Kaufman ............. B23K 9/1087
                                                    219/130.1

(Continued)

FOREIGN PATENT DOCUMENTS

CN    103732342    4/2014
CN    104602850    5/2015

(Continued)

OTHER PUBLICATIONS

Int'l Search Report and Written Opinion Appln. No. PCT/US2019//034859 mailed Oct. 14, 2019 (13 pgs.).

(Continued)

*Primary Examiner* — Vy T Nguyen
(74) *Attorney, Agent, or Firm* — McAndrews, Held & Malloy, Ltd.

(57) ABSTRACT

Welding power supplies and user interfaces to control output polarity for welding power supplies are disclosed. An example welding power supply includes: a first terminal and a second terminal configured to be connected to welding equipment; power conversion circuitry configured to convert input power to weld power and to output the weld power via the first and second terminals; an interface, including: one or more first input devices configured to receive a selection of a wire feeding weld process; and one or more second input devices configured to receive a selection of a polarity of the weld power; and control circuitry configured to, in response to receiving, via the interface, an input associated with at least one of the wire feeding weld process or the selection of the output polarity, control the polarity of the weld power output via the power conversion circuitry to the first and second terminals.

20 Claims, 6 Drawing Sheets

(56) References Cited

U.S. PATENT DOCUMENTS

| | | |
|---|---|---|
| 8,785,817 B2 | 7/2014 | Luck |
| 9,583,023 B2 * | 2/2017 | Becker ..................... G09B 5/02 |
| 10,056,010 B2 * | 8/2018 | Salsich .................... G09B 5/02 |
| 2006/0138113 A1 * | 6/2006 | Ott ....................... B23K 9/1087 |
| | | 219/132 |
| 2007/0080154 A1 * | 4/2007 | Ott ........................ B23K 9/095 |
| | | 219/132 |
| 2011/0006046 A1 * | 1/2011 | Albrecht .............. B23K 9/1006 |
| | | 219/133 |
| 2011/0049116 A1 | 3/2011 | Rappl |
| 2011/0114607 A1 * | 5/2011 | Albrecht .............. B23K 9/1006 |
| | | 219/108 |
| 2011/0309062 A1 * | 12/2011 | O'Donnell ............ B23K 9/125 |
| | | 219/130.1 |
| 2012/0298643 A1 * | 11/2012 | Lambert ................. B23K 9/10 |
| | | 219/130.21 |
| 2013/0043226 A1 * | 2/2013 | Stanzel ............... B23K 9/1006 |
| | | 219/130.21 |
| 2013/0228656 A1 * | 9/2013 | Ireland ................... A63H 19/24 |
| | | 246/122 A |
| 2013/0319987 A1 | 12/2013 | Beistle |
| 2014/0097164 A1 * | 4/2014 | Beistle ................. B23K 9/1012 |
| | | 219/130.33 |
| 2015/0014290 A1 | 1/2015 | Kooken |
| 2015/0136746 A1 * | 5/2015 | Rappl .................... B23K 9/124 |
| | | 219/130.21 |

FOREIGN PATENT DOCUMENTS

| | | |
|---|---|---|
| CN | 107442897 | 12/2017 |
| CN | 107708908 | 2/2018 |
| CN | 107896489 | 4/2018 |

OTHER PUBLICATIONS

PipeWorx 400 Welding system (380-400 Volt Model ) CE Owner's Manual, Miller®, OM-253906N, Mar. 2016.

Shopmaster™ 300 AC/DC Owner's Manual, Miller®, OM-322, Apr. 2002.

European Office Communication Appln No. 19731525.2 dated Aug. 29, 2022.

European Examination Report Appln No. 19731525.2 dated Oct. 18, 2023.

\* cited by examiner

WELDING POWER SUPPLIES AND USER INTERFACES TO CONTROL OUTPUT POLARITY FOR WELDING POWER SUPPLIES

RELATED APPLICATIONS

This patent claims priority to U.S. Provisional Patent Application Ser. No. 62/678,489, filed May 31, 2018, entitled "Welding Power Supplies and User Interfaces to Control Output Polarity for Welding Power Supplies." The entirety of U.S. Provisional Patent Application Ser. No. 62/678,489 is incorporated herein by reference.

BACKGROUND

This disclosure relates generally to welding systems and, more particularly, to welding power supplies and user interfaces to control output polarity for welding power supplies.

Myriad interface types have been used for conventional power supplies. Conventional user interface for power supplies either rely on the operator to manually select the appropriate parameters, such as voltage and wire feed speed, or rely on the operator specifying the material thickness and then calculating appropriate parameters from the material thickness.

SUMMARY

Welding power supplies and user interfaces to control output polarity for welding power supplies are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1A:
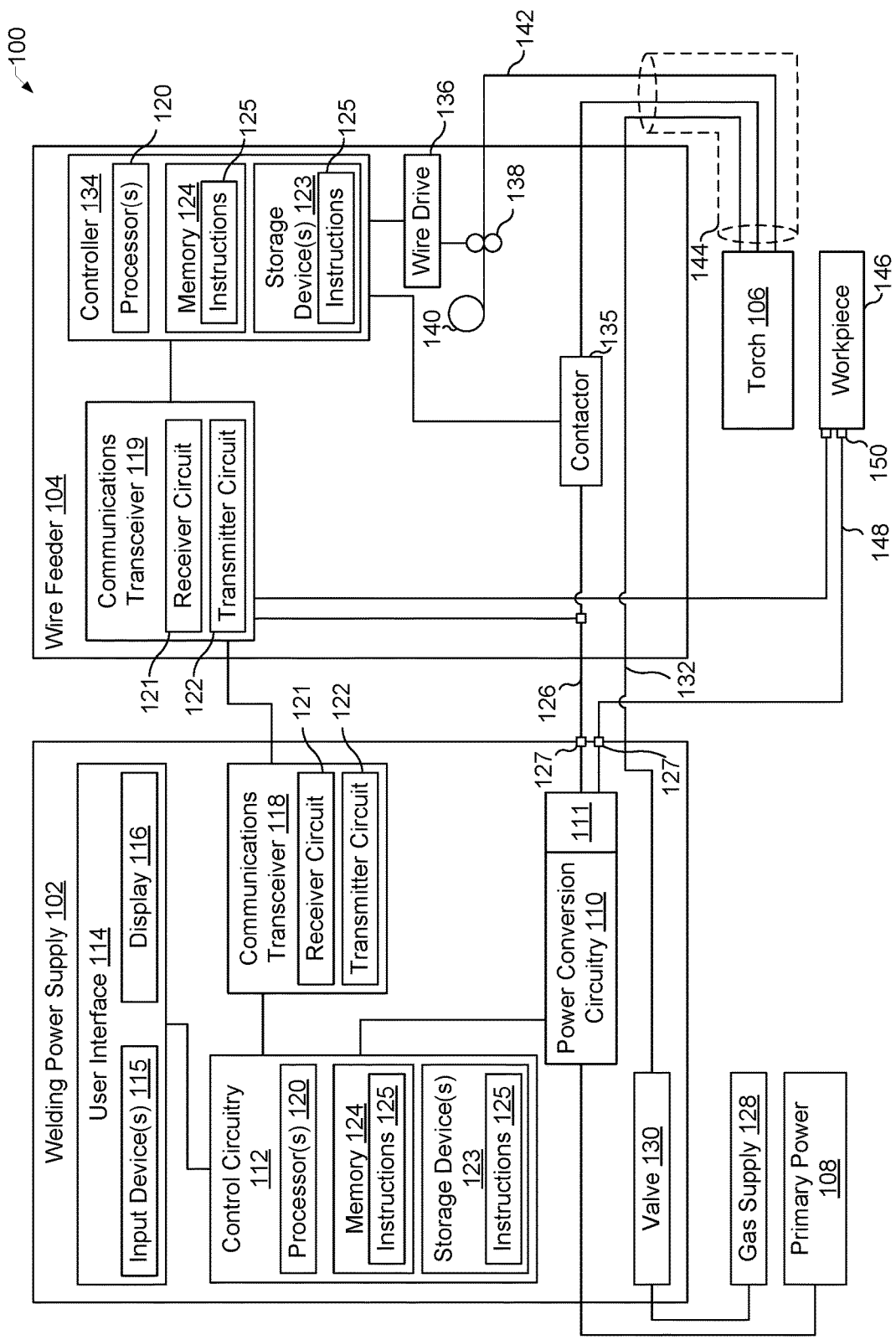
FIG. 1A is a schematic diagram of an example welding system including a power supply having a user interface to control an output polarity, in accordance with aspects of this disclosure.

As used herein, the term "inductance parameter" refers to a parameter used to control a rate of change (or slope) of a welding output, and may be controlled by directly controlling a physical inductance of a circuit and/or by controlling to mimic an induction effect in a weld circuit.

Disclosed example power supplies, wire feeders, and/or other welding equipment include user interfaces that may be used to control output polarity from a welding power supply. In disclosed examples, the welding power supply includes two output terminals which may be alternated in polarity by controlling polarity switching circuitry. In some examples, the user interface enables control and adjustment of inductance, or arc control or arc force. By accessing the inductance parameter menu and adjusting the inductance parameter, an output polarity can be changed. The inductance parameter may have a range (e.g., 1-99), and adjusting the inductance parameter outside of the range results in a change in welding process (e.g., from gas metal arc welding (GMAW) to flux-cored arc welding (FCAW)) and/or a change in polarity from direct current electrode positive (DCEP) to direct current electrode negative (DCEN). The selection of the output polarity via the inductance parameter menu causes control of the power conversion circuitry to output welding power with a corresponding output polarity from the two output terminals.

Disclosed user interfaces displays an indication of the output polarity selection to inform the operator. The polarity selection and/or the display may occur at the power supply and/or remotely at a remote wire feeder or remote pendant connected to the power supply.

Disclosed example welding power supplies include: a first terminal and a second terminal configured to be connected to welding equipment; power conversion circuitry configured to convert input power to weld power and to output the weld power via the first and second terminals; an interface, and control circuitry. The interface includes one or more first input devices configured to receive a selection of a wire feeding weld process, and one or more second input devices configured to receive a selection of a polarity of the weld power. The control circuitry is configured to, in response to receiving, via the interface, an input associated with at least one of the wire feeding weld process or the selection of the output polarity, control the polarity of the weld power output via the power conversion circuitry to the first and second terminals.

In some examples, the power conversion circuitry includes at least one of a full bridge topology or a half bridge topology. In some examples, the control circuitry is configured to control the polarity of the weld power by controlling a commutator portion of the power conversion circuitry. In some example welding power supplies, the interface is configured to receive the selection of the polarity of the weld power in association with a weld inductance parameter. In some examples, the control circuitry is configured to, in response to selection of the polarity of the weld power, control the weld inductance parameter to have a predetermined value.

In some example welding power supplies, the interface is configured to receive the selection of the polarity of the weld power in association with a selection of a flux-cored electrode wire type. In some examples, the interface is configured to display an indication of the selected polarity in response to receiving the selection of the polarity of the weld power or the selection of the wire feeding weld process.

In some example welding power supplies, the interface includes communications circuitry configured to communicate with a remote device, in which the control circuitry is configured to transmit, via the communications circuitry, at least one of an indication of the polarity of the weld power or an indication of the selected wire feeding weld process. In some examples, the communications circuitry is configured to communicate with the remote device via at least one of the first and second terminals. In some examples, the interface is configured to receive the selection of a wire feeding weld process and the selection of a polarity of the weld power via the communications circuitry.

Disclosed example welding power supplies include: a first terminal and a second terminal configured to be connected to welding equipment; power conversion circuitry configured to convert input power to weld power and to output the weld power via the first and second terminals; an interface, and control circuitry. The interface includes a first input device configured to receive a selection of a wire feeding weld process or a non-wire feeding weld process, and a second input device configured to receive a selection of an inductance parameter of the weld power for a first wire feeding weld process and to alternately receive a selection of a polarity of the weld power for a second wire feeding weld process. The control circuitry is configured to, in response to receiving, via the interface, an input associated with the wire feeding weld process from the first input device and an input associated with the first wire feeding weld process or the second wire feeding weld process or the selection of the output polarity, control the polarity of the weld power output via the power conversion circuitry to the first and second terminals.

In some example power supplies, the power conversion circuitry includes at least one of a full bridge topology or a half bridge topology. In some examples, the control circuitry is configured to control the polarity of the weld power by controlling a commutator portion of the power conversion circuitry. In some examples, the interface is configured to receive the selection of the polarity of the weld power in association with a weld inductance parameter via the second input device. In some examples, the control circuitry is configured to, in response to selection of the polarity of the weld power, control the weld inductance parameter to have a predetermined value.

In some example power supplies, the interface is configured to receive the selection of the polarity of the weld power in association with a selection of a flux-cored electrode wire type as the second wire feeding weld process. In some examples, the interface is configured to display an indication of the selected polarity in response to receiving the selection of the polarity of the weld power or the selection of the second wire feeding weld process.

In some examples, the interface includes communications circuitry configured to communicate with a remote device, and the control circuitry is configured to transmit, via the communications circuitry, at least one of an indication of the polarity of the weld power or an indication of the selected wire feeding weld process. In some examples, the communications circuitry is configured to communicate with the remote device via at least one of the first and second terminals. In some examples, the interface is configured to receive the selection of a wire feeding weld process and the selection of a polarity of the weld power via the communications circuitry.

Turning now to the drawings, FIG. 1A is a block diagram of an example welding system 100 having a welding-type power supply 102, a wire feeder 104, and a welding torch 106. The welding system 100 powers, controls, and supplies consumables to a welding application. In some examples, the power supply 102 directly supplies input power to the welding torch 106. The welding torch 106 may be a torch configured for shielded metal arc welding (SMAW, or stick welding), tungsten inert gas (TIG) welding, gas metal arc welding (GMAW), flux cored arc welding (FCAW), based on the desired welding application. In the illustrated example, the power supply 102 is configured to supply power to the wire feeder 104, and the wire feeder 104 may be configured to route the input power to the welding torch 106. In addition to supplying an input power, the wire feeder 104 may supply a filler metal to a welding torch 106 for various welding applications (e.g., GMAW welding, flux core arc welding (FCAW)). While the example system 100 of FIG. 1A includes a wire feeder 104 (e.g., for GMAW or FCAW welding), the wire feeder 104 may be replaced by any other type of remote accessory device, such as a stick welding and/or TIG welding remote control interface that provides stick and/or TIG welding The power supply 102 receives primary power 108 (e.g., from the AC power grid, an engine/generator set, a battery, or other energy generating or storage devices, or a combination thereof), conditions the primary power, and provides an output power to one or more welding devices in accordance with demands of the system 100. The primary power 108 may be supplied from an offsite location (e.g., the primary power may originate from the power grid). The power supply 102 includes power conversion circuitry 110, which may include transformers, rectifiers, switches, and so forth, capable of converting the AC input power to AC and/or DC output power as dictated by the demands of the system 100 (e.g., particular welding processes and regimes). The power conversion circuitry 110 converts input power (e.g., the primary power 108) to welding-type power based on a weld voltage setpoint and outputs the welding-type power via a weld circuit.

The power supply 102 includes a control circuitry 112 to control the operation of the power supply 102. The power supply 102 also includes a user interface 114. The control circuitry 112 receives input from the user interface 114, through which a user may choose a process and/or input desired parameters (e.g., voltages, currents, particular pulsed or non-pulsed welding regimes, and so forth). The user interface 114 may receive inputs using one or more input devices 115, such as via a keypad, keyboard, physical buttons, a touch screen (e.g., software buttons), a voice activation system, a wireless device, etc. Furthermore, the control circuitry 112 controls operating parameters based on input by the user as well as based on other current operating parameters. Specifically, the user interface 114 may include a display 116 for presenting, showing, or indicating, information to an operator. The control circuitry 112 may also include interface circuitry for communicating data to other devices in the system 100, such as the wire feeder 104. For example, in some situations, the power supply 102 wirelessly communicates with other welding devices within the welding system 100. Further, in some situations, the power supply 102 communicates with other welding devices using a wired connection, such as by using a network interface controller (NIC) to communicate data via a network (e.g., ETHERNET, 10 baseT, 10 base100, etc.). In the example of FIG. 1A, the control circuitry 112 communicates with the wire feeder 104 via a communications transceiver 118, as described below.

The control circuitry 112 includes at least one controller or processor 120 that controls the operations of the power supply 102. The control circuitry 112 receives and processes multiple inputs associated with the performance and demands of the system 100. The processor 120 may include one or more microprocessors, such as one or more "general-purpose" microprocessors, one or more special-purpose microprocessors and/or ASICS, and/or any other type of processing device. For example, the processor 120 may include one or more digital signal processors (DSPs).

The example control circuitry 112 includes one or more storage device(s) 123 and one or more memory device(s) 124. The storage device(s) 123 (e.g., nonvolatile storage) may include ROM, flash memory, a hard drive, and/or any other suitable optical, magnetic, and/or solid-state storage medium, and/or a combination thereof. The storage device 123 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth.

The memory device 124 may include a volatile memory, such as random access memory (RAM), and/or a nonvolatile memory, such as read-only memory (ROM). The memory device 124 and/or the storage device(s) 123 may store a variety of information and may be used for various purposes. For example, the memory device 124 and/or the storage device(s) 123 may store processor executable instructions 125 (e.g., firmware or software) for the processor 120 to execute. In addition, one or more control regimes for various welding processes, along with associated settings and parameters, may be stored in the storage device 123 and/or memory device 124, along with code configured to provide a specific output (e.g., initiate wire feed, enable gas flow, capture welding current data, detect short circuit parameters, determine amount of spatter) during operation.

In some examples, the welding power flows from the power conversion circuitry 110 through a weld cable 126 to the wire feeder 104 and the welding torch 106. The example weld cable 126 is attachable and detachable from output terminals 127 at each of the power supply 102 and the wire feeder 104 (e.g., to enable ease of replacement of the weld cable 126 in case of wear or damage). Furthermore, in some examples, welding data is provided with the weld cable 126 such that welding power and weld data are provided and transmitted together over the weld cable 126. The communications transceiver 118 is communicatively coupled to the weld cable 126 to communicate (e.g., send/receive) data over the weld cable 126. The communications transceiver 118 may be implemented using serial communications (e.g., full-duplex RS-232 or RS-422, or half-duplex RS-485), network communications (e.g., Ethernet, PROFIBUS, IEEE 802.1X wireless communications, etc.), parallel communications, and/or any other type of communications techniques. In some examples, the communications transceiver 118 may implement communications over the weld cable 126.

The example communications transceiver 118 includes a receiver circuit 121 and a transmitter circuit 122. Generally, the receiver circuit 121 receives data transmitted by the wire feeder 104 via the weld cable 126 and the transmitter circuit 122 transmits data to the wire feeder 104 via the weld cable 126. The communications transceiver 118 enables remote configuration of the power supply 102 from the location of the wire feeder 104, and/or command and/or control of the wire feed speed output by the wire feeder 104 and/or the weld power (e.g., voltage, current) output by the power supply 102.

The example wire feeder 104 also includes a communications transceiver 119, which may be similar or identical in construction and/or function as the communications transceiver 118. While communication over a separate communications cable is illustrated in FIG. 1A, other communication media, such as wireless media, power line communications, and/or any other communications media, may be used.

In some examples, a gas supply 128 provides shielding gases, such as argon, helium, carbon dioxide, and so forth, depending upon the welding application. The shielding gas flows to a valve 130, which controls the flow of gas, and if desired, may be selected to allow for modulating or regulating the amount of gas supplied to a welding application. The valve 130 may be opened, closed, or otherwise operated by the control circuitry 112 to enable, inhibit, or control gas flow (e.g., shielding gas) through the valve 130. Shielding gas exits the valve 130 and flows through a cable 132 (which in some implementations may be packaged with the welding power output) to the wire feeder 104 which provides the shielding gas to the welding application. In some examples, the welding system 100 does not include the gas supply 128, the valve 130, and/or the cable 132.

In some examples, the wire feeder 104 uses the welding power to power the various components in the wire feeder 104, such as to power a wire feeder controller 134. As noted above, the weld cable 126 may be configured to provide or supply the welding power. The power supply 102 may also communicate with a communications transceiver 119 of the wire feeder 104 using the weld cable 126 and the communications transceiver 118 disposed within the power supply 102. In some examples, the communications transceiver 119 is substantially similar to the communications transceiver 118 of the power supply 102. The wire feeder controller 134 controls the operations of the wire feeder 104. In some examples, the wire feeder 104 uses the wire feeder controller 134 to detect whether the wire feeder 104 is in communication with the power supply 102 and to detect a current welding process of the power supply 102 if the wire feeder 104 is in communication with the power supply 102.

A contactor 135 (e.g., high amperage relay) is controlled by the wire feeder controller 134 and configured to enable or inhibit welding power to continue to flow to the weld cable 126 for the welding application. In some examples, the contactor 135 is an electromechanical device. However, the contactor 135 may be any other suitable device, such as a solid state device. The wire feeder 104 includes a wire drive 136 that receives control signals from the wire feeder controller 134 to drive rollers 138 that rotate to pull wire off a spool 140 of wire. The wire is provided to the welding application through a torch cable 142. Likewise, the wire feeder 104 may provide the shielding gas from the cable 132 through the cable 142. The electrode wire, the shield gas, and the power from the weld cable 126 are bundled together in a single torch cable 144 and/or individually provided to the welding torch 106. In some examples, the contactor 135 is omitted and power is initiated and stopped by the power supply 102.

The welding torch 106 delivers the wire, welding power, and/or shielding gas for a welding application. The welding torch 106 is used to establish a welding arc between the welding torch 106 and a workpiece 146. A work cable 148 couples the workpiece 146 to the power supply 102 (e.g., to the power conversion circuitry 110) to provide a return path for the weld current (e.g., as part of the weld circuit). The example work cable 148 attachable and/or detachable from the power supply 102 for ease of replacement of the work cable 148. The work cable 148 may be terminated with a clamp 150 (or another power connecting device), which couples the power supply 102 to the workpiece 146.

The weld cable 126 and the work cable 148 are coupled to the welding power supply 102 via output terminals 127.

The example power conversion circuitry 110 of FIG. 1A includes polarity switching circuitry 111 to control the polarity of the output power with respect to the output terminals 127. That is, the power conversion circuitry 110 may output positive polarity power to the weld cable 126 (e.g., for DCEP welding) or negative polarity power to the weld cable 126 (e.g., for DCEN welding). Example polarity switching circuitry 111 may include commutation circuitry that directs current from switched mode power supply circuitry to either of the terminals 127 and controls the return of current via the other of the terminals 127. The power conversion circuitry 110 may be, for example, a half-bridge or a full-bridge topology, and/or any other type of power conversion topologies.

The control circuitry 112 controls the polarity switching circuitry 111 to output the power from the power conversion circuitry 110 as electrode positive, electrode negative, and/or alternating (e.g., AC, pulse, etc.). As explained in more detail below, the example control circuitry 112 may control the polarity switching circuitry 111 based on the selection of one or more parameters via the user interface 114 (e.g., via the input device(s) 115). The user interface 114 may receive a selection of a wire feeding weld process and/or a selection of a polarity of a weld power via the input devices 115. The selection of the wire feeding weld process and/or the selection of the polarity of the weld power may be received in association with designated weld parameters.

Figure 1B:
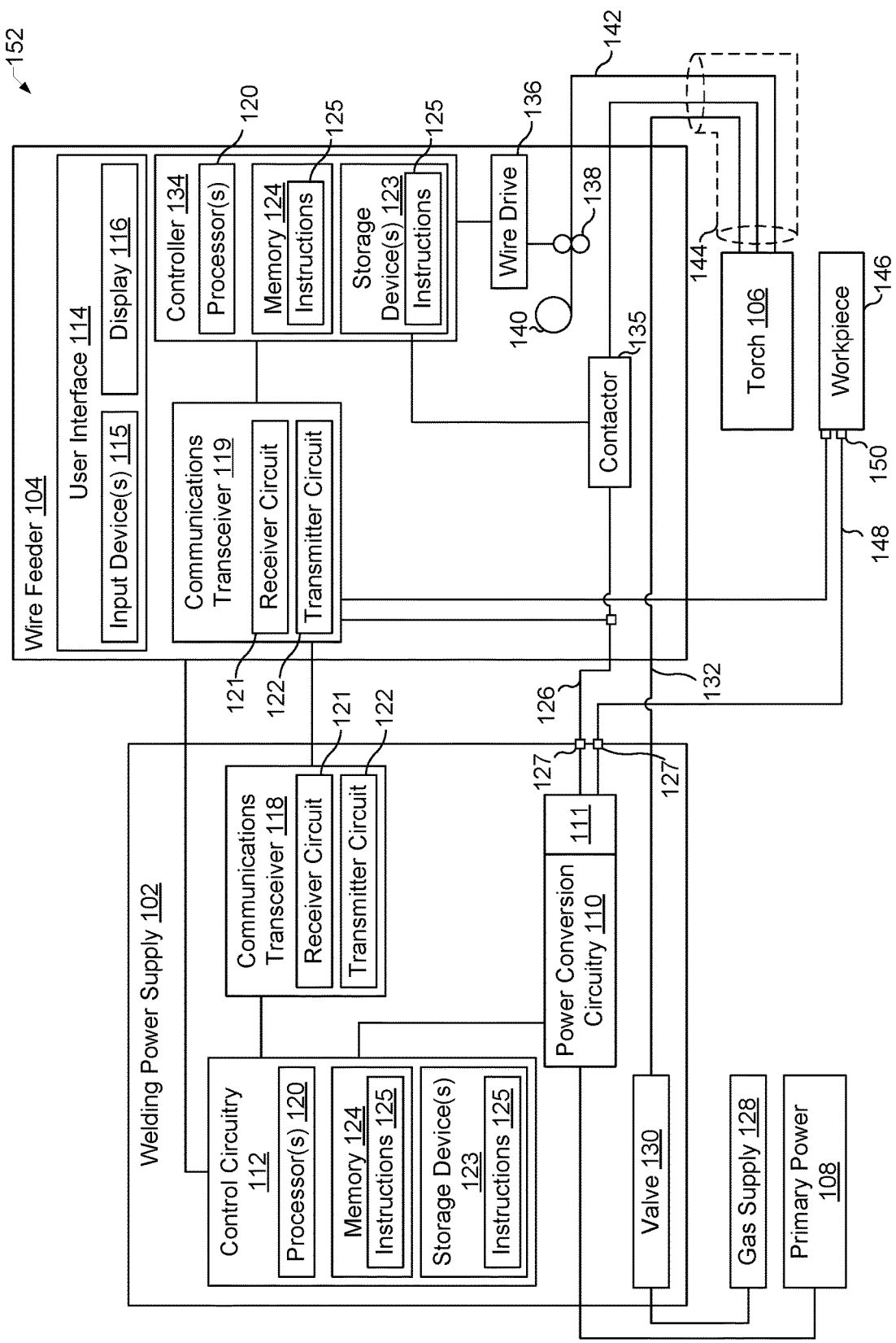
FIG. 1B is a schematic diagram of another example welding system including a wire feeder having a user interface to control an output polarity, in accordance with aspects of this disclosure.

FIG. 1B is a schematic diagram of another example welding system 152 in which the wire feeder 104 includes the user interface 114 in addition or as an alternative to the user interface on the welding power supply 102. In the example of FIG. 1B, the control circuitry 134 of the wire feeder 104 implements the determinations of the welding program and welding parameters which are described with reference to the control circuitry 112 of FIG. 1A.

In some examples, the wire feeder 104 (or other welding device) provides user input to the power supply 102 and/or visual output from the power supply 102 for adjusting parameters. For example, the communications transceivers 118, 119 may communicate commands and/or data to enable a user to adjust parameters of the power supply 102 remotely via the wire feeder 104. For example, the user interface 114 of the wire feeder 104 may display an indication of the polarity of the weld power or an indication of the selected wire feeding weld process. Additionally or alternatively, the power supply 102 may receive the selection of a wire feeding weld process and/or the selection of a polarity of the weld power from the wire feeder 104 via the communications circuitry 118, 119.

Figure 1C:
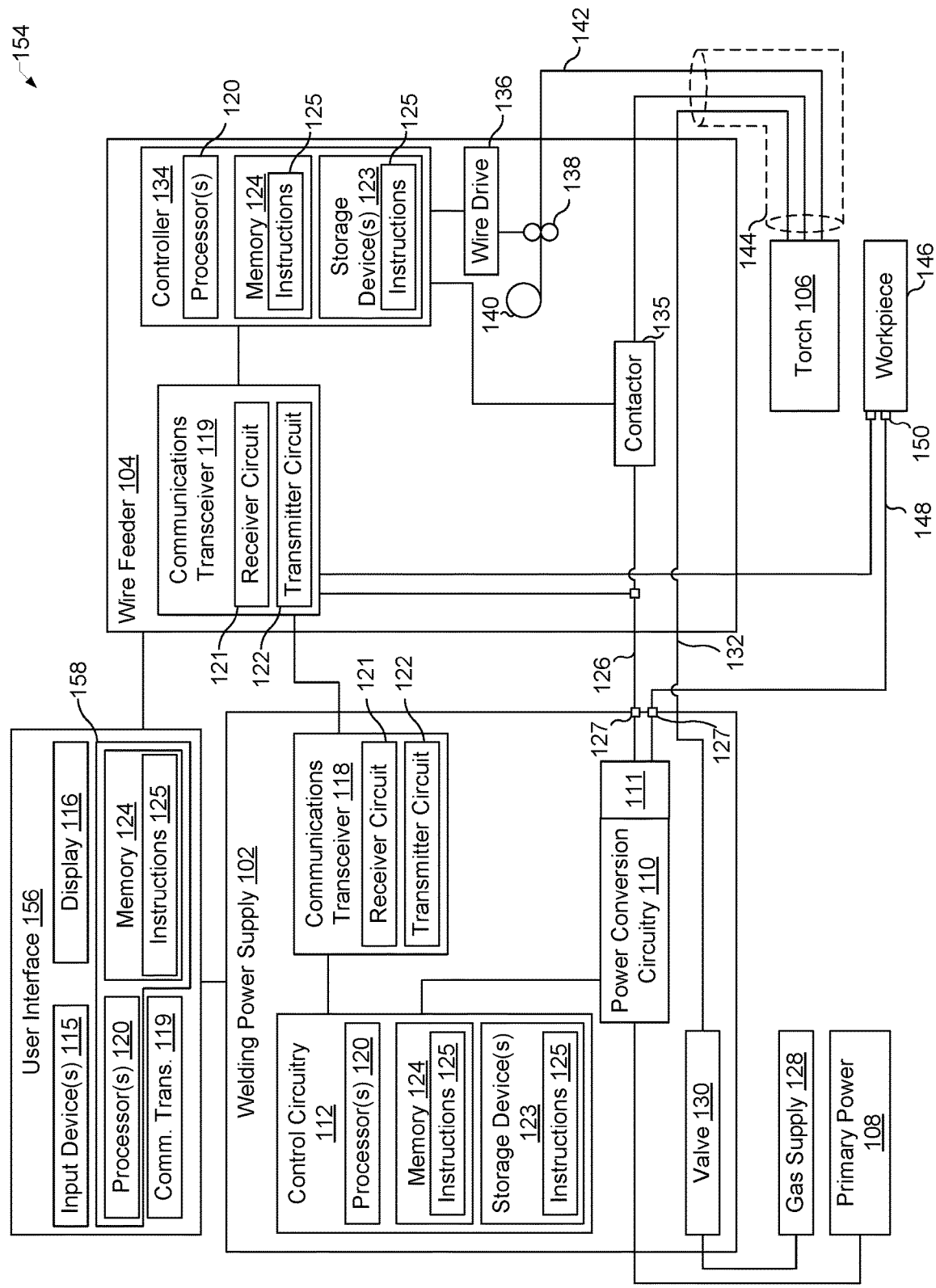
FIG. 1C is a schematic diagram of another example welding system including a user interface connected to a welding power supply and/or a wire feeder to control an output polarity, in accordance with aspects of this disclosure.

FIG. 1C is a schematic diagram of another example welding system 154 including a separate user interface 156. The user interface 156 is a separate device, and may be connected to the welding power supply 102 and/or to the wire feeder 104 to provide commands and/or control information. The example user interface 156 includes the input devices 115 and the display 116, and includes control circuitry 158. The example control circuitry 158 includes the processor(s) 120 and the memory 124 storing the instructions 125. The example user interface 156 further includes a communications transceiver 119 to enable communications between the user interface 156 and the welding power supply 102 and/or the wire feeder.

Figure 2A:
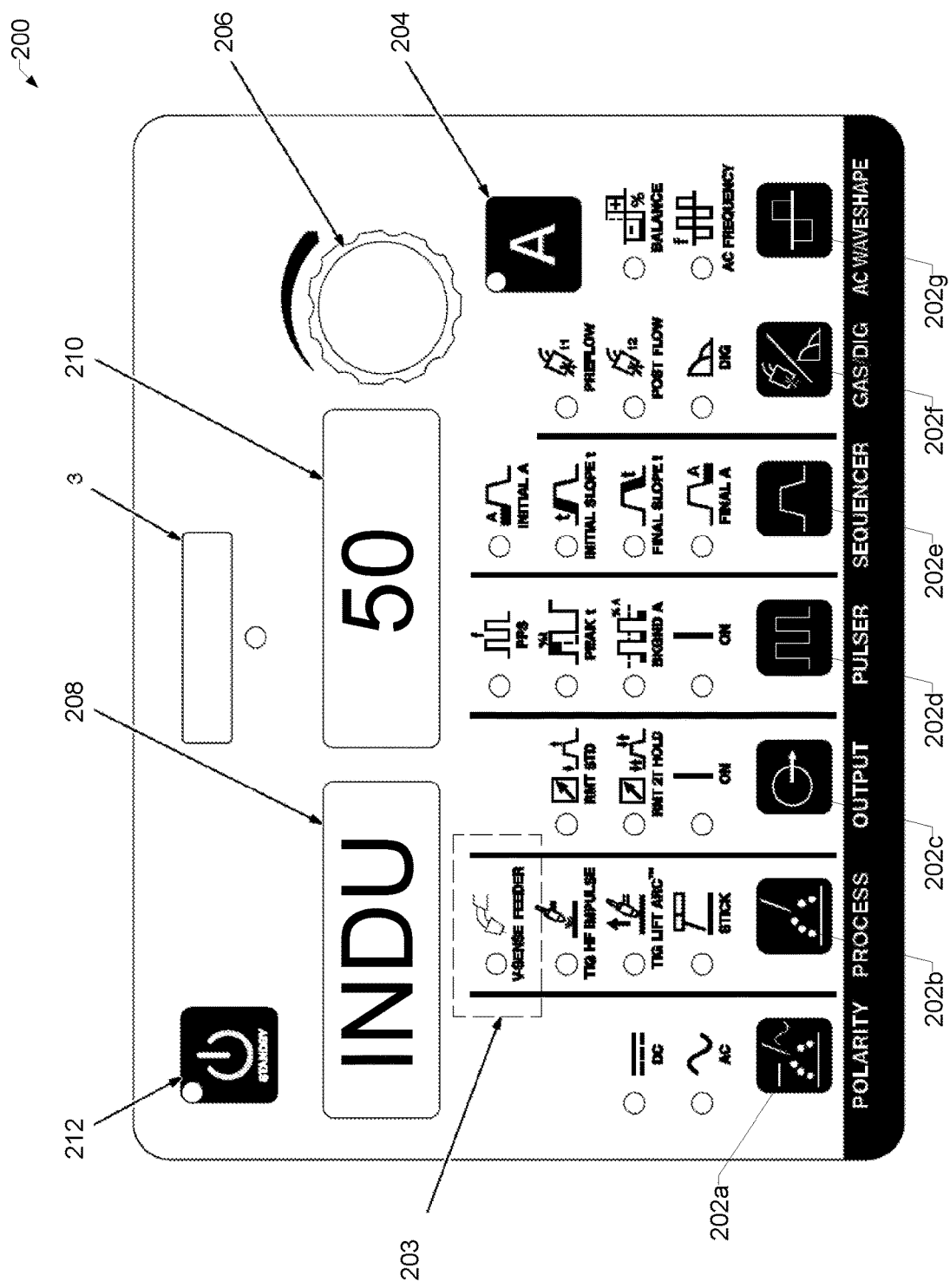
FIGS. 2A and 2B illustrate an example user interface that may be used to implement the user interface of FIG. 1A.
Figure 2B:
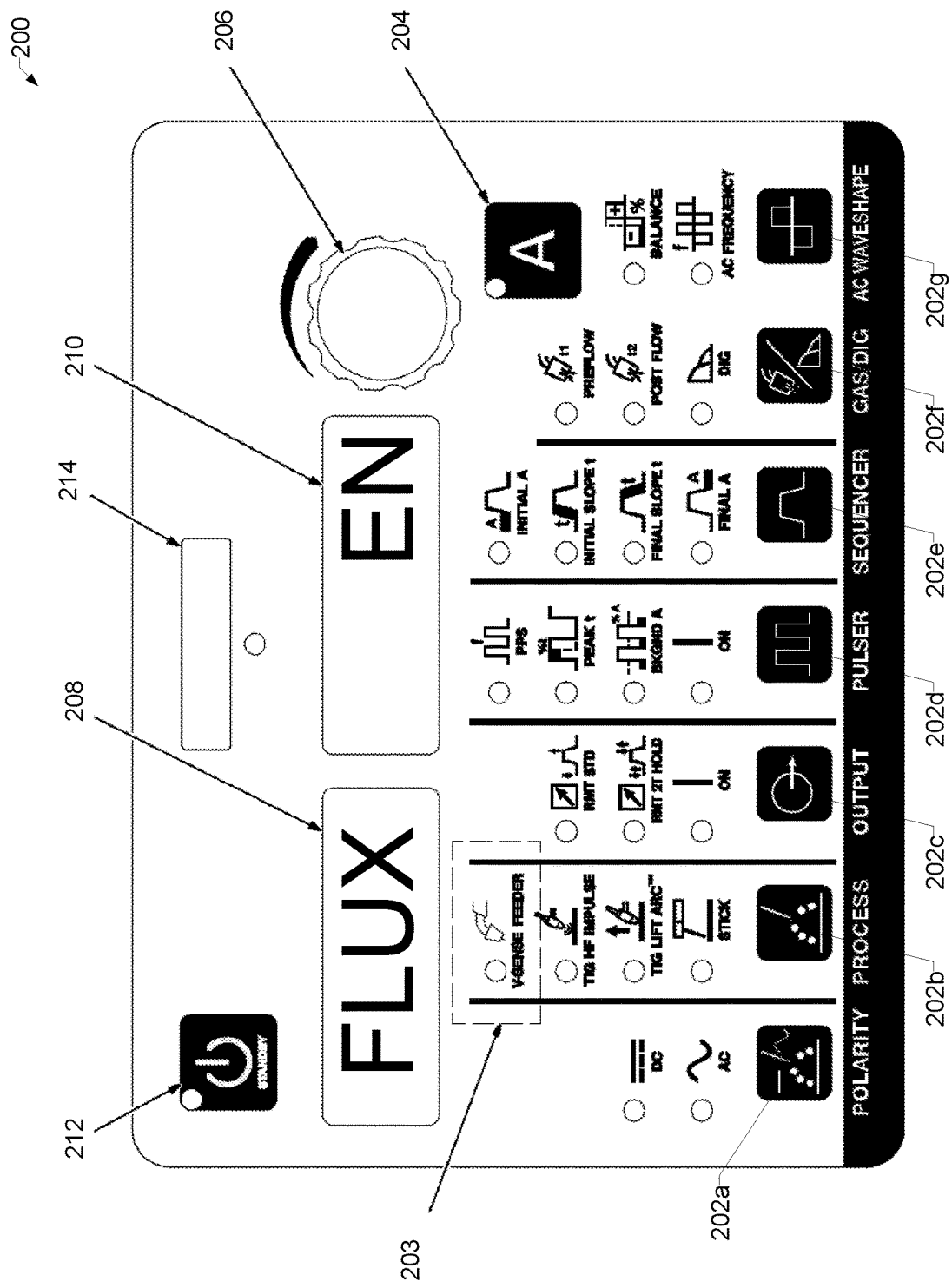

FIGS. 2A and 2B illustrate an example user interface 200 that may be used to implement the user interface 114 of FIG. 1A. The example user interface 200 includes selection input devices 202a-202g to enable selection of one or more parameters. The selection input devices 202a-202g of FIGS. 2A and 2B are hardware buttons, but may be implemented using other types of input devices.

The selection input device 202a enables selection between AC and DC polarities. The selection input device 202b enables selection between welding processes, such as GMAW welding using a voltage-sensing wire feeder (e.g., process 203), GTAW welding using high frequency impulse starting, GTAW welding using lift arc starting, SMAW welding, and/or any other type of welding processes.

The selection input device 202c enables selection between trigger modes, such as using a remote foot or hand control, an enabled output (e.g., hot output for SMAW or GTAW processes). The selection input device 202d enables configuration of pulse parameters, and the selection input device 202e enables configuration of weld sequence parameters.

The selection input device 202f enables selection of gas pre-flow, gas post-flow, and/or arc control parameters. In some examples, the selection input device 202f further enables selection of an inductance setting when a GMAW process is selected (e.g., via the selection input device 202b). The selection input device 202g enables selection and configuration of AC parameters.

The example user interface 200 further includes an amperage selection input 204 and a parameter adjustment device 206. The example amperage selection input 204 selects the amperage parameter to be adjusted by the parameter adjustment device 206. The parameter adjustment device 206 may be used to adjust a selected parameter, such as the amperage or a parameter selected by one or more of the selection input devices 202c-202g.

The user interface 200 further includes display devices 208, 210, which may implement the display(s) 116 of FIG. 1A. The display devices 208, 210 may be liquid crystal display (LCD) screens, LED segment displays, and/or any other type of display devices. The control circuitry 112 may output information associated with a selected parameter, selected values, and/or any other information to be provided to the user via the user interface 200.

In some examples, when the voltage sensing feeder GMAW process is selected (via the selection input device 202b), the selection input device 202f may be selected to select an inductance (or "arc control") parameter. The control circuitry 112 may limit the availability of the inductance parameter to selected weld processes.

The control circuitry 112 may permit selection of an electrode negative polarity via the inductance parameter. For example, the voltage sensing feeder GMAW process typically has a DCEP polarity via the output terminals, and the control circuitry 112 may control an inductance parameter of the power conversion circuitry 110 between a range of values based on the inductance value specified via the parameter adjustment device 206.

The user interface 200 may also enable the selection of a DCEN polarity by increasing the inductance value above the upper limit of the inductance parameter (or below the lower limit of the inductance parameter). For example, if the nominal inductance range is 0-99, increasing the inductance parameter value above 99 via the parameter adjustment device 206 causes the control circuitry 112 to select a DCEN polarity. As illustrated in FIG. 2B, the control circuitry 112 outputs an indication of the selected DCEN polarity via the display devices 208, 210. For example, the display device 208 shows "FLUX" and the display device 210 shows "EN" (electrode negative). After a short time, the display device 210 may revert to showing "CORE," such that the display devices 208, 210 show, in combination, "FLUX CORE." Other example indications may include displaying "DCEN,"

"Negative," or the like, to indicate the electrode negative polarity. Additionally or alternatively, one or more of the input devices 202a-202g, 204 may cause the display devices 208, 210 to show the electrode polarity and/or other information, such as the selected voltage setpoint. For example, selection of the amperage selection input 204 while the voltage sensing wire feeding process 203 is shown causes the display device 208 to show the voltage setpoint and the display device 210 to show the polarity (e.g., EN or EP).

The foregoing selection and display interactions are examples, and other implementations may be used to select the output polarity, display the output polarity and/or welding process, and/or to control the power conversion circuitry 110 and/or polarity switching circuitry 111 based on the selected polarity.

While the inductance parameter is set to electrode negative, the control circuitry 112 controls the power conversion circuitry 110 to output electrode negative welding power during welding operations. The control circuitry 112 may use a predetermined inductance value. In other examples, the control circuitry 112 may also permit the user to select an inductance value for use in electrode negative polarity.

The user interface 200 may include other input and/or output devices, such as a power or standby button 212 (e.g., to turn the power supply 102 on or off) and/or or a storage card interface 214 (e.g., to enable a user to insert data storage media).

Figure 3:
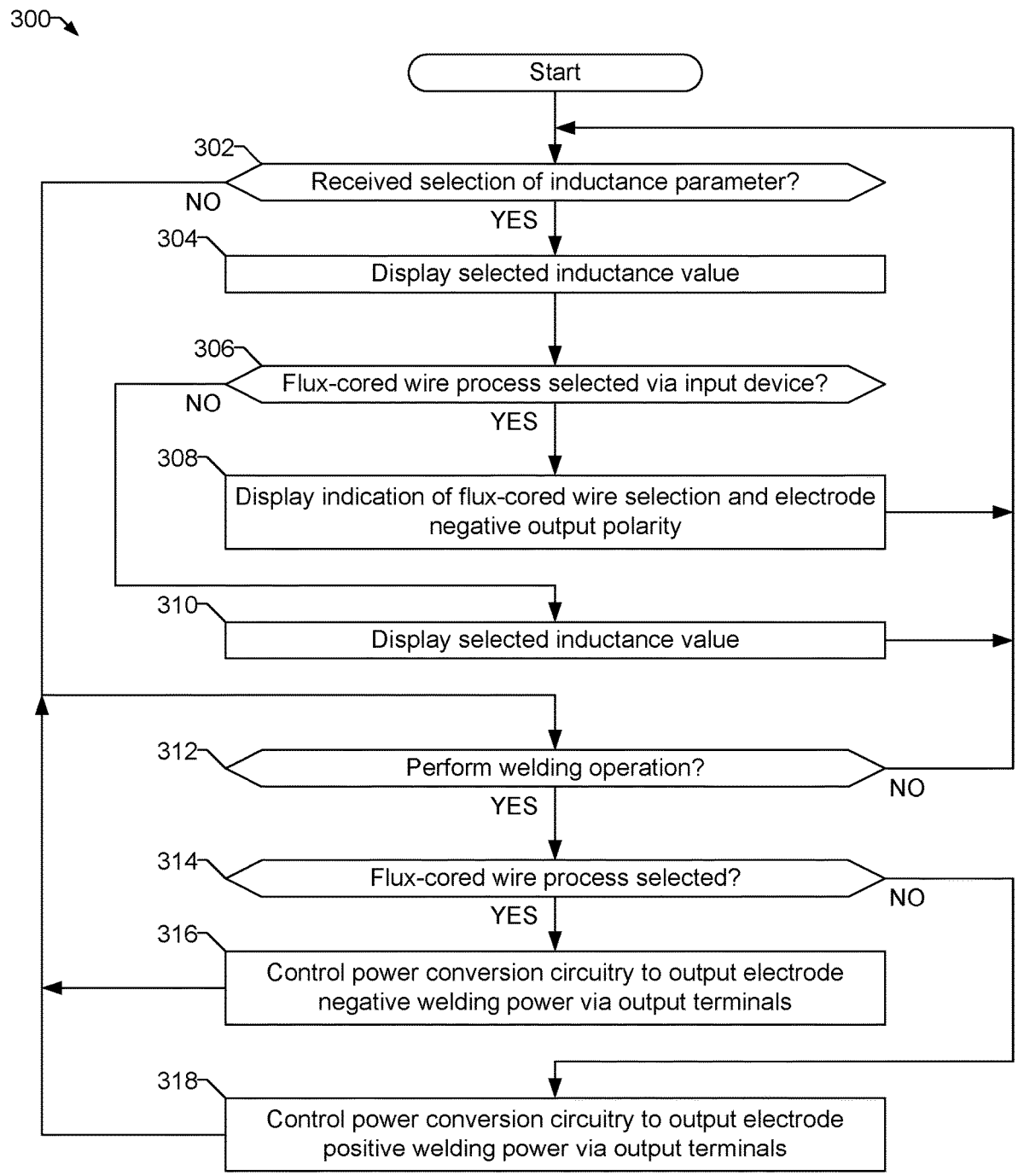
FIG. 3 is a flowchart representative of example machine readable instructions which may be executed by the example welding power supply of FIG. 1A to control an output polarity using the user interface.

FIG. 3 is a flowchart representative of example machine readable instructions 300 which may be executed by the example welding power supply 102 of FIG. 1A to control an output polarity using the user interface 114. The example instructions 300 may be executed by the control circuitry 112 and/or stored in the storage device 123 and/or the memory 124.

At block 302, the control circuitry 112 determines whether a selection of an inductance parameter has been received (e.g., via the selection input devices 202f). If selection of an inductance parameter has been received (block 302), at block 304 the control circuitry 112 displays the selected inductance value (e.g., via the displays 208, 210).

At block 306, the control circuitry 112 determines whether a flux-cored wire process has been selected via an input device. For example, the control circuitry 112 may determine whether a value of the inductance parameter has exceeded the value range for the inductance parameter via the parameter adjustment device 206. If the flux-cored wire process has been selected (block 306), at block 308 the control circuitry 112 displays an indication of the flux-cored wire process selection and an electrode negative output polarity (e.g., via the displays 208, 210). On the other hand, if the flux-cored wire process has not been selected (block 306), at block 310 the control circuitry 112 continues to display the selected inductance value.

After displaying the indication of flux-cored wire selection and electrode negative output polarity (block 308) or after displaying the selected inductance value (block 310), control returns to block 302.

If the selection of the inductance parameter has not been received (block 302), at block 312 the control circuitry 112 determines whether a welding operation is being performed. For example, the control circuitry 112 may determine whether the trigger of the welding torch 106 has been depressed to initiate delivery of welding current. If a welding operation is not being performed (block 312), control returns to block 302.

If a welding operation is being performed (block 312), at block 314 the control circuitry 112 determines whether a flux-cored wire process is selected. If the flux-cored wire process is selected (block 314), at block 316 the control circuitry 112 controls the power conversion circuitry 112 (e.g., via the polarity switching circuitry 111) to output electrode negative welding power via the output terminals 127). Conversely, if the flux-cored wire process is not selected (block 314), at block 318 the control circuitry 112 controls the power conversion circuitry 112 (e.g., via the polarity switching circuitry 111) to output electrode positive welding power via the output terminals 127). After controlling the power conversion circuitry (block 316, 318), control returns to block 312.

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be a processing system integrated into a welding power supply with a program or other code that, when being loaded and executed, controls the welding power supply such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine readable storage media and to exclude propagating signals.

The control circuitry 112 may identify welding conditions of a given weld and automatically find the optimum value of rate of current rise for the welding conditions. An example control circuit implementation may be an Atmel Mega16 microcontroller, a STM32F407 microcontroller, a field programmable logic circuit and/or any other control or logic circuit capable of executing instructions that executes weld control software. The control circuit could also be implemented in analog circuits and/or a combination of digital and analog circuitry. Examples are described herein with reference to an engine-driven stick welder, but may be used or modified for use in any type of high frequency switching power source.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed.

Instead, the present method and/or system will include all implementations falling within the scope of the appended claims, both literally and under the doctrine of equivalents.

What is claimed is:

1. A welding power supply, comprising:
   a first terminal and a second terminal configured to be connected to welding equipment;
   power conversion circuitry configured to convert input power to weld power and to output the weld power via the first and second terminals;
   an interface, comprising:
      one or more first input devices configured to receive a selection of a wire feeding weld process; and
      a second input device configured to:
         receive a selection of a value of a welding parameter having a range of the selectable values of the welding parameter, wherein the welding parameter is a different parameter than the polarity of the weld power; and
         in response to exceeding the range of the selectable values of the welding parameter via the second input device, receive a selection of the polarity of the weld power; and
   control circuitry configured to, in response to receiving, via the interface, an input associated with at least one of the wire feeding weld process or the selection of the output polarity, control the polarity of the weld power output via the power conversion circuitry to the first and second terminals.

2. The welding power supply as defined in claim 1, wherein the power conversion circuitry comprises at least one of a full bridge topology or a half bridge topology.

3. The welding power supply as defined in claim 2, wherein the control circuitry is configured to control the polarity of the weld power by controlling a commutator portion of the power conversion circuitry.

4. The welding power supply as defined in claim 1, wherein the interface is configured to receive the selection of the polarity of the weld power in association with a weld inductance parameter.

5. The welding power supply as defined in claim 4, wherein the control circuitry is configured to, in response to selection of the polarity of the weld power, control the weld inductance parameter to have a predetermined value.

6. The welding power supply as defined in claim 1, wherein the interface is configured to receive the selection of the polarity of the weld power in association with a selection of a flux-cored electrode wire type.

7. The welding power supply as defined in claim 1, wherein the interface is configured to display an indication of the selected polarity in response to receiving the selection of the polarity of the weld power or the selection of the wire feeding weld process.

8. The welding power supply as defined in claim 1, wherein the interface comprises communications circuitry configured to communicate with a remote device, the control circuitry configured to transmit, via the communications circuitry, at least one of an indication of the polarity of the weld power or an indication of the selected wire feeding weld process.

9. The welding power supply as defined in claim 8, wherein the communications circuitry is configured to communicate with the remote device via at least one of the first and second terminals.

10. The welding power supply as defined in claim 8, wherein the interface is configured to receive the selection of a wire feeding weld process and the selection of a polarity of the weld power via the communications circuitry.

11. The welding power supply as defined in claim 1, wherein the range of the selectable values of the welding parameter is a numerical range.

12. A welding power supply, comprising:
   a first terminal and a second terminal configured to be connected to welding equipment;
   power conversion circuitry configured to convert input power to weld power and to output the weld power via the first and second terminals;
   an interface, comprising:
      a first input device configured to receive a selection of a wire feeding weld process or a non-wire feeding weld process; and
      a second input device configured to:
         receive a first input selection of an inductance parameter of the weld power for a first wire feeding weld process, the inductance parameter having a range of the selectable values via the second input device; and
         in response to exceeding the range of the selectable values of the inductance parameter via the second input device, receive a selection of the polarity of the weld power; and
   control circuitry configured to, in response to receiving, via the interface, an input associated with the wire feeding weld process from the first input device and an input associated with the first wire feeding weld process or the second wire feeding weld process or the second input selection of the output polarity, control the polarity of the weld power output via the power conversion circuitry to the first and second terminals.

13. The welding power supply as defined in claim 12, wherein the power conversion circuitry comprises at least one of a full bridge topology or a half bridge topology.

14. The welding power supply as defined in claim 13, wherein the control circuitry is configured to control the polarity of the weld power by controlling a commutator portion of the power conversion circuitry.

15. The welding power supply as defined in claim 12, wherein the control circuitry is configured to, in response to the second input selection of the polarity of the weld power, control the weld inductance parameter to have a predetermined value.

16. The welding power supply as defined in claim 12, wherein the interface is configured to receive the second input selection of the polarity of the weld power in association with a selection of a flux-cored electrode wire type as the second wire feeding weld process.

17. The welding power supply as defined in claim 12, wherein the interface is configured to display an indication of the selected polarity in response to receiving the second input selection of the polarity of the weld power or the selection of the second wire feeding weld process.

18. The welding power supply as defined in claim 12, wherein the interface comprises communications circuitry configured to communicate with a remote device, the control circuitry configured to transmit, via the communications circuitry, at least one of an indication of the polarity of the weld power or an indication of the selected wire feeding weld process.

19. The welding power supply as defined in claim 18, wherein the communications circuitry is configured to communicate with the remote device via at least one of the first and second terminals.

20. The welding power supply as defined in claim 18, wherein the interface is configured to receive the selection of a wire feeding weld process and the second input selection of a polarity of the weld power via the communications circuitry.

* * * * *